(12) United States Patent
Kroemmer et al.

(10) Patent No.: US 8,172,200 B2
(45) Date of Patent: May 8, 2012

(54) FLOW CONTROL VALVE FOR FLUIDIZED MATERIAL

(75) Inventors: Yvan Kroemmer, Goetzingen (LU); Emanuele Censi, Luxembourg (LU)

(73) Assignee: Paul Wurth S.A., Luxembourg (LU)

( * ) Notice: Subject to any disclaimer, the term of this patent is extended or adjusted under 35 U.S.C. 154(b) by 693 days.

(21) Appl. No.: 12/160,754

(22) PCT Filed: Nov. 30, 2006

(86) PCT No.: PCT/EP2006/069093
§ 371 (c)(1),
(2), (4) Date: Jul. 11, 2008

(87) PCT Pub. No.: WO2007/080029
PCT Pub. Date: Jul. 19, 2007

(65) Prior Publication Data
US 2010/0163769 A1 Jul. 1, 2010

(30) Foreign Application Priority Data
Jan. 11, 2006 (EP) .................................. 06100240

(51) Int. Cl.
*F16K 25/00* (2006.01)

(52) U.S. Cl. .................. 251/181; 251/180; 251/192

(58) Field of Classification Search .............. 251/176, 251/180, 181, 192
See application file for complete search history.

(56) References Cited

U.S. PATENT DOCUMENTS

| 1,755,057 | A | | 4/1930 | Fagan et al. | |
|---|---|---|---|---|---|
| 2,298,036 | A | * | 10/1942 | Cohen | 251/163 |
| 3,014,690 | A | | 12/1961 | Boteler | |
| 3,326,514 | A | | 6/1967 | Riley | |
| 3,537,559 | A | * | 11/1970 | McNeal, Jr. | 192/150 |
| 4,050,472 | A | * | 9/1977 | Sheppard | 137/242 |
| 4,073,471 | A | * | 2/1978 | Lehtinen | 251/176 |
| 4,688,756 | A | * | 8/1987 | Kindersely | 251/183 |
| 5,101,853 | A | | 4/1992 | Mailliet et al. | |
| 6,802,268 | B2 | * | 10/2004 | Kroemmer et al. | 110/186 |

FOREIGN PATENT DOCUMENTS
DE 1930733 1/1970

OTHER PUBLICATIONS
International Search Report PCT/EP2006/069093 Dated Mar. 12, 2007.

* cited by examiner

*Primary Examiner* — John Fristoe, Jr.
*Assistant Examiner* — Marina Tietjen
(74) *Attorney, Agent, or Firm* — Cantor Colburn LLP

(57) ABSTRACT

A flow control valve for fluidized material comprises a valve housing having a valve chamber with a valve seat and a valve plug having a flow passage, the valve plug being arranged inside the valve chamber in front of the valve seat (30) so as to be rotatable about an axis of rotation for controlling a flow through the flow control valve. It further comprises spring means biasing the valve plug against the valve seat perpendicularly to the axis of rotation, for achieving a sealing contact between the valve seat and the valve plug. According to an important aspect of the invention, the spring means comprises at least one cantilever spring (40) arranged in a clearance space opposite to the valve seat (30) so as to bias the valve plug against the valve seat.

26 Claims, 2 Drawing Sheets

FLOW CONTROL VALVE FOR FLUIDIZED MATERIAL

TECHNICAL FIELD OF THE INVENTION

The present invention relates to a flow control valve for fluidized material, in particular for use in pneumatic conveying systems of fluidized material.

BRIEF DISCUSSION OF RELATED ART

In conveying systems for fluidized material, fluidized materials are conveyed in bulk through conduits by means of a carrier fluid such as a carrier gas or carrier liquid. A specific example of a
pneumatic conveying system using a carrier gas is a pulverized coal injection system for injecting pulverized coal of fine grain size through tuyeres into a blast furnace.

In order to allow metering of bulk material, it is well known within the field of fluidized material conveying to provide a flow control valve in a conduit for controlling the flow rate of the carrier fluid and hence also the flow rate of bulk material passing through the valve.

A common example of a flow control valve, used e.g. in pulverized coal injection systems, is a plug valve. A plug valve conventionally comprises a valve housing having a valve chamber with a valve seat and a valve plug having a flow passage. The valve plug is arranged inside the valve chamber in front of the valve seat and rotatable about an axis of rotation. Rotation enables controlling a flow through the valve by setting the position of the flow passage of the valve plug relative to the valve seat.

Obviously, sealing contact between the valve seat and the valve plug is an important requirement for any valve. When a flow control valve is to be used in a system where the operating temperature of the carrier fluid and/or ambient temperature and hence temperature of the valve itself are subject to significant variations, achieving a sealing contact between the plug and the seat can be problematic. In fact, temperature variations may cause leakage of the valve e.g. due to differing thermal expansion of the valve housing and the valve plug and/or the valve seat. This problem occurs for example in pulverized coal injection. In such cases, it is known for plug valves to provide the valve with spring means biasing the valve plug and the valve seat against each other in a direction perpendicular to the axis of rotation of the valve plug. In a first possible design, the seat is spring biased against the plug. In a second possible design, which is of concern for the present invention, the plug is spring biased against the seat.

In many known spring biased plug valves, the spring means consist of helical springs arranged in guiding bores of the valve housing so as to bias the plug and the seat together. It has been found that this type of spring biased plug valve does not sufficiently warrant fluid-tightness in certain applications and especially in a pulverized coal injection system operated at high temperatures and pressures. Furthermore, in conveying systems for fluidized bulk material, fine particles originating from the fluidized bulk material flow tend to accumulate in cavities inside the valve housing and hence also inside the guiding bores of the helical springs. Hence helical springs are susceptible to being blocked in a certain position. Once spring biasing is impeded, fluid-tightness obviously becomes deficient, in particular with temperature variations. This is especially problematic in a pneumatic conveying system where gas-tightness is an important requirement. As a further detrimental consequence of potential blocking, damage to the valve or, in case of a motor operated valve, damage to the motor unit may occur when the valve is operated in such a blocked condition.

BRIEF SUMMARY OF THE INVENTION

The invention provides a flow control valve for fluidized material which improves fluid tight contact between valve plug and valve seat, irrespective of operating conditions and fine particle accumulation.

The invention further proposes a flow control valve for fluidized material comprising a valve housing having a valve chamber with a valve seat and a valve plug having a flow passage, the valve plug being arranged inside the valve chamber in front of the valve seat so as to be rotatable about an axis of rotation for controlling a flow through the flow control valve. The flow control valve further comprises spring means biasing the valve plug against the valve seat perpendicularly to the axis of rotation, for achieving a sealing contact between the valve seat and the valve plug. According to an important aspect of the invention, the spring means comprises at least one cantilever spring arranged in a clearance space opposite to the valve seat so as to bias the valve plug against the valve seat.

The flow control valve according to the invention achieves improved fluid-tightness, irrespective of the operating conditions of the valve. Furthermore, the use of cantilever type flexion springs eliminates the need for helical springs with guiding bores and hence the spring biasing function of the valve is rendered insensitive to clogging by fine particles.

In a preferred embodiment, the at least one cantilever spring is a rod spring. The rod spring has a first end portion spring biasing the valve plug against the valve seat and a second end portion fixed to the valve housing. Although other cantilever type flexion springs such as leaf springs could be used, rod springs are preferred.

In order to achieve a more uniform distribution of bending stress over the length of the rod spring, the rod spring preferably tapers towards its first end portion.

Advantageously, the cantilever spring comprises a saddle member mounted on a first end portion of the cantilever spring and having a contact surface conformed to the outer surface of the valve plug. This configuration enables an intimate surface contact of a certain area between spring and plug.

As a further benefit of cantilever springs, the flow control valve can comprise, in a preferred embodiment, an adjustment device supporting the second end portion of the rod spring, the adjustment device allowing the axial position of the rod spring with respect to the valve plug to be set. Since the pre-tension of each cantilever spring and hence the contact pressure between valve plug and valve seat can be set, the adjustment capability proves beneficial to warrant fluid-tightness. Initial adjustment enables adapting the valve for a certain application (different pressures, temperatures, fluid types, etc.). Adjustment during service life enables taking into account process variations or wear of the valve parts for example. For setting the axial position of the rod spring, the adjustment device preferably comprises an operating portion which protrudes from the valve housing. Adjustment during operation of the valve is thereby enabled.

In order to achieve a uniform contact between valve plug and valve seat, is advantageous to provide two pairs of cantilever springs that are arranged in corresponding clearance spaces tangentially with respect to the valve plug and on opposing sides of a flow channel through the valve housing. In this configuration, the cantilever springs of each pair are preferably arranged in parallel and two cantilever springs of either pair are arranged in opposing coaxial relationship.

Advantageously, the flow control valve further comprises an actuating shaft mounted rotatable in the valve housing and an Oldham coupling which couples the valve plug to the actuating shaft. This configuration represents a simple and reliable manner of floatingly mounting the valve plug inside the valve chamber, in order to allow displacement of the valve plug against the valve seat.

In order to facilitate access to the cantilever springs, and especially their respective adjustment devices, the clearance space of each cantilever spring is preferably arranged perpendicular to the axis of the actuating shaft in the valve housing.

Although plug valves with spherical plugs could also benefit from the use of cantilever springs, it is preferred, especially in pneumatic conveying systems, that the valve plug comprises an essentially cylindrical hollow body having a cylindrical plug sealing face in contact with a corresponding sealing face of the valve seat and a cylindrical plug biasing face in contact with a first end portion of the cantilever spring or, if provided, the contact surface of the saddle member.

As will be appreciated, the flow control valve according to the present invention is especially suitable for use in a pulverized coal injection system for a blast furnace.

BRIEF DESCRIPTION OF THE DRAWINGS

A preferred embodiment of the invention will now be described, by way of example, with reference to the accompanying drawings in which.

Further details and advantages of the present invention will be apparent from the following detailed description.

DETAILED DESCRIPTION OF THE INVENTION

Figure 1:
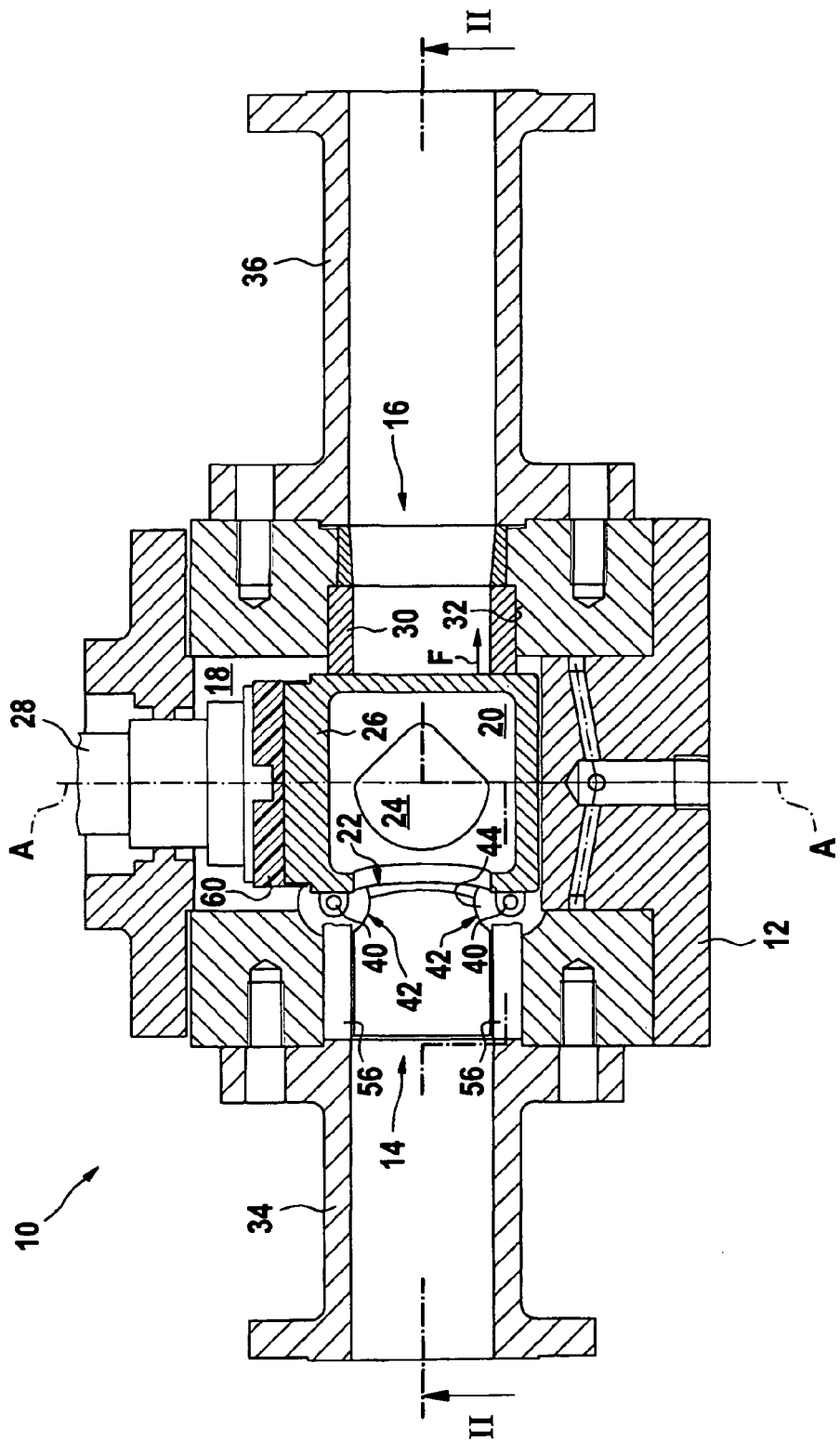
FIG. 1: is a longitudinal cross sectional view of a flow control valve according to the invention.

FIG. 1 shows a flow control valve for fluidized material, generally identified by reference numeral 10. The flow control valve 10 is designed to be used in a conduit of a conveying system for fluidized bulk material, in particular a pneumatic conveying installation such as pulverized coal injection system for a blast furnace.

The flow control valve 10 comprises a valve housing 12 having an inlet port 14 and an outlet port 16. The valve housing 12 delimits therein a valve chamber 18 communicating with the inlet port 14 and the outlet port 16. A valve plug 20 is arranged inside the valve chamber 18. The valve plug 20 has a body of generally cylindrical hollow configuration with a first aperture 22 and a second aperture 24 arranged laterally in the cylindrical shell of the plug body. The apertures 22, 24 provide a flow passage through the valve plug 20. The valve plug 20 further comprises a coupling portion 26 for coupling the valve plug 20 to an actuating shaft 28 which is rotatably mounted in the valve housing 12.

The flow control valve 10 further comprises a valve seat 30 which is fixed in the valve housing 12 on the periphery of the valve chamber 18. The valve seat 30 has a generally tubular, cylindrical shape and is arranged in a conjugated socket 32 in the valve housing 12. The valve seat 30 provides a further flow passage through which the valve chamber 18 communicates with the outlet port 16. As seen in FIG. 1, the valve plug 20 is arranged in front of the valve seat 30. The valve plug 20 is rotatable about an axis of rotation A by means of the actuating shaft 28. In a manner known per se for plug type valves, the rotational position of the valve plug 20 relative to the valve seat 30 allows to control the flow through the valve 10 by setting the degree of coincidence between the flow passages in the valve plug 20 an the valve seat 30 respectively. In this respect, it may be noted that the second aperture 24 of the valve plug 20 has the combined shape of a tapered generally triangular first portion and a generally semi-circular second portion (seen in planar projection). This shape allows to improve flow control by making the intersecting flow passage area an essentially linear function of the angular position of the valve plug 20 (when coincidence is limited to the first generally triangular portion of the aperture 24). As further seen in FIG. 1, two mounting flanges 34, 36 are mounted to the valve housing 12 in extension of the inlet port 14 and the outlet port 16 respectively.

Figure 2:
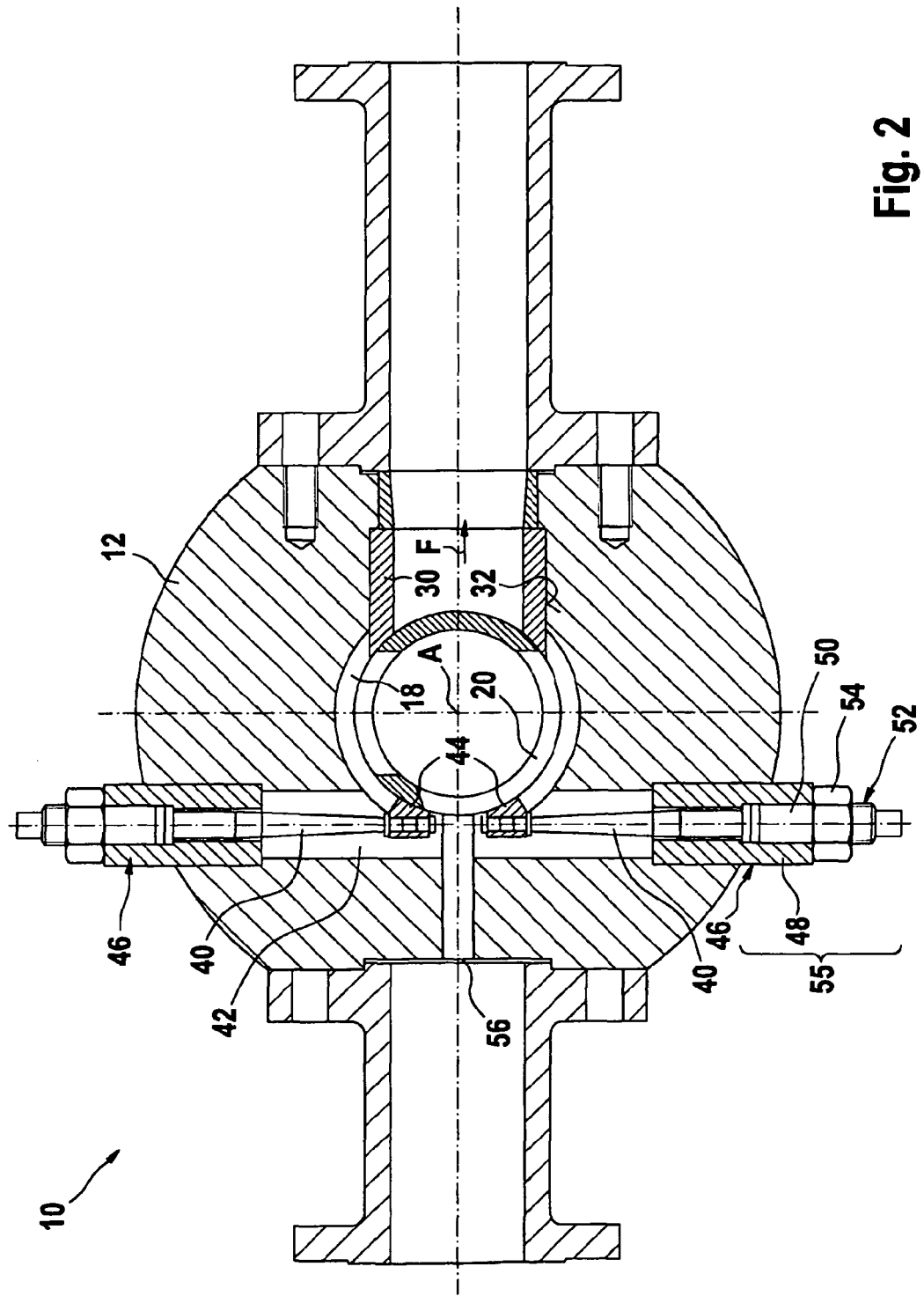
FIG. 2: is cross sectional view of the flow control valve along the line II-II in FIG. 1.

As best seen in FIG. 2, the valve plug 20 has a cylindrical outer sealing surface portion. The valve plug 20 need not be cylindrical however, other types are also possible, e.g. spherical plugs, provided that the sealing surface portion is a surface portion of a solid of revolution. The valve seat 30 is provided with a sealing surface portion precisely conformed to the sealing surface of the valve plug 20 such that sealing contact between both is possible.

As further seen in FIG. 2, spring means are provided for biasing the valve plug 20 against the valve seat 30 in a direction perpendicular to the axis of rotation A, for achieving a sealing contact between the valve seat 30 and the valve plug 20. According to the invention, these spring means comprises cantilever springs 40. It will be understood that the cantilever springs 40 are flexion springs functioning by elasticity of flexure. Although other types of cantilever springs such as leaf springs could be used, it is preferred that the cantilever springs are rod springs 40 of circular cross section, for reasons that will become apparent below. As appears from FIG. 1 and FIG. 2, four rod springs 40 are arranged in respective clearance spaces 42 adjacent to the valve chamber 18 and opposite to the valve seat 30. Each rod spring 40 has a first end portion tangential to the valve plug 20 and spring biasing the valve plug 20 against the valve seat 30 and a second end portion fixed to the valve housing 12. As will be understood, the direction of the resultant spring biasing force F produced by the rod springs 40 is perpendicular to the axis of rotation A and directed towards the valve seat 30.

As seen in FIG. 2, each rod spring 40 is configured as conical rod tapering towards its first end portion. A more uniform bending stress distribution over the length of the rod spring 40 is thereby obtained when compared to cylindrical rods. In order to provide a surface contact between each rod spring 40 and the valve plug 20 each rod spring 40 has a saddle member 44 mounted on its first end portion. Each saddle member 44 has a contact surface conformed to the cylindrical outer surface of the valve plug 20.

As further seen in FIG. 2, each rod spring is mounted to the valve housing 12 by means of a respective adjustment device 46. The adjustment device 46 supports the second end portion of the associated rod spring 40 in a manner which allows setting, i.e. adjusting the axial position of this rod spring 40 with respect to the valve plug 20 and hence the tangential contact point between them. As will be understood, axial positioning of the rod spring 40 allows to reduce or increase the distance between its first end portion and the axis of rotation A, while maintaining tangential contact with the valve plug 20. Hence, by virtue of the adjustment devices 46, the flexion of the rod spring 40 and consequently the magnitude of the force F, i.e. the degree of spring biasing can be adjusted. To this effect, each adjustment device 46 comprises a hollow cylindrical sleeve 48 fixed in a bore in elongation of the respective clearance space 42 so as to protrude from the valve housing 12, an internally threaded bushing 50 fixed inside the sleeve 48, which cooperates with a corresponding external thread 52 on the second end portion of the rod spring 40, and a locknut 54 screwed onto the external thread 52 in abutment with the sleeve 48. When the locknut 54 is loosened, the axial position of the rod spring 40 can be adjusted precisely by turning i.e. screwing the rod spring 40, for example using a torque wrench. To this effect, the body of the rod spring 40 has rotationally symmetrical shape with circular cross sections tapering towards the front end. As will be appreciated, the adjustment device 46 has an operating portion 55, formed by the locknut 54 and the external portions of the sleeve 48 and the spring rod 40, which protrudes from the valve housing 12. By virtue of this design, the adjustment device 46 can be operated without the need to dismantle the valve housing 12 i.e. during operation, e.g. to readjust sealing contact pressure or to recover from a blocking condition. It will also be appreciated that besides adjusting, the construction of the adjustment device 46 allows easy disassembling and removal of the rod spring 40 e.g. for maintenance or inspection purposes. Two retention pins 56 are provided in the valve housing 12 in order to avoid dislocation of the valve plug 20 when the rod springs 40 are removed. In order to maintain engagement of the saddle members 44 on the valve plug 20 in any axial position and during rotation, each saddle member 44 is mounted on its rod spring 40 so as to be rotatable about the longitudinal axis of the rod spring 40 and preferably slightly pivotable about an axis parallel to axis A, e.g. by means of a spherical joint.

It will be understood from FIG. 1 and FIG. 2 that two pairs of rod springs 40 are arranged, on opposing sides of the flow channel through the valve housing 12, in corresponding clearance spaces 42 tangentially with respect to the valve plug 20. The rod springs 40 of each pair are arranged in parallel (i.e. with parallel longitudinal axes and assuming no pretension). Two rod springs 40 of either pair are arranged in opposing coaxial relationship as seen in FIG. 2. This arrangement of the four rod springs 40 warrants a uniform contact pressure on the sealing surfaces of the valve seat 30 and the valve plug 20.

As seen in FIG. 1, the valve plug 20 is coupled to the actuating shaft 28 by means of a coupling member 60. The coupling member 60 is generally disc shaped and configured as Oldham coupling. To this effect, the coupling member 60 has a linear recess on a first side, which cooperates with a conjugated rib of the actuating shaft 28, and a linear rib on a second side which is perpendicular to the recess on the first side and cooperates with a conjugated recess in the coupling portion 26 of the valve plug 20. This configuration enables a floating mounting of the valve plug 20 inside the valve chamber 18 to allow some displacement between the rotational axis A of the valve plug 20 and the axis of the actuating shaft 28. Parallelism of both axes is maintained by this Oldham coupling configuration in combination with a suitable rest for the valve plug 20 on the side opposite to the coupling member 26.

As further seen in FIG. 1, the essentially cylindrical clearance spaces 42 are arranged perpendicular to the axis of the actuating shaft 28 in the valve housing 12. By virtue of this arrangement access for personnel to the adjustment devices 46 is facilitated.

Regarding preferred materials, it will be understood that each spring rod is made of spring steel. The valve plug 20, valve seat 30 and the saddle members 44 are in turn made of a hard metal or hard alloy. The valve housing itself can be made of any suitable material, e.g. conventional steel.

Finally, some important advantages obtained by the flow control valve 10 according to the invention remain to be mentioned:

Using cantilever flexion springs 40 in combination with suitable clearance spaces 42 renders the required spring biasing function much more reliable and virtually insensitive to clogging and blocking caused by fine particle accumulation.

As a result, the flow control valve 10 offers more reliable fluid-tightness in virtually any condition and can therefore be used in safety critical applications and/or severe environments, e.g. in a pulverized coal injection system on a blast furnace.

By virtue of the cantilever flexion springs 40, the flow control valve 10 has improved tolerance with respect to differing thermal expansion of the constituent material of the valve housing 12 and of the valve plug 20 and/or the seat 30.

In combination with the adjustment device 46, the cantilever flexion springs 40 allow to precisely and optimally set the sealing contact pressure. This allows adapting the valve 10 to different working conditions and reducing wear of the plug 20 and the seat 30. Furthermore, the required actuation torque can be reduced when compared to conventional valves that are often over-biased for safety reasons.

The construction of the flow control valve 10 in general, and the adjustment device 46 in particular, allows to set the sealing contact pressure during operation time such that no downtime is required.

Since the risk of blocking of the valve plug 20 in a given position is drastically reduced, the risk of resulting damage to the valve and, if provided, its actuation motor is also reduced.

The construction of the flow control valve 10, in general and the adjustment device 46 in particular, facilitates maintenance of the internal parts of the valve 10 when compared to conventional spring biased valves using helical springs.

The invention claimed is:

1. A flow control valve for fluidized material comprising:
a valve housing having first and second retention pins and a valve chamber with a valve seat, said valve seat being arranged in a conjugated socket in said valve housing;
a valve plug having a flow passage, said valve plug being arranged inside said valve chamber in front of said valve seat so as to be rotatable about an axis of rotation for controlling a flow through said flow control valve and said valve plug comprises a cylindrical plug biasing surface; and
at least one cantilever spring arranged in a clearance space opposite to said valve seat, said cantilever spring being fixed to said valve housing and having an end portion in contact with said cylindrical plug biasing surface so as to bias said valve plug against said valve seat perpendicularly to said axis of rotation for achieving a sealing contact between said valve seat and said valve plug, wherein said first and second retention pins are configured to secure said valve plug when said at least one cantilever spring is removed.

2. The flow control valve according to claim 1, wherein said at least one cantilever spring is a rod spring with a first end portion spring biasing said valve plug against said valve seat and a second end portion fixed to said valve housing.

3. The flow control valve according to claim 2, wherein said rod spring tapers towards its first end portion.

4. The flow control valve according to claim 3, wherein said rod spring comprises a saddle member mounted on a first end portion of said rod spring and having a contact surface conformed to the outer cylindrical plug biasing surface of said valve plug.

5. The flow control valve according to claim 4, further comprising an adjustment device supporting said second end portion of said rod spring, said adjustment device allowing the axial position of said rod spring with respect to said valve plug to be set.

6. The flow control valve according to claim 5, wherein said adjustment device comprises an operating portion for setting the axial position of said rod spring, said operating portion protruding from said valve housing.

7. The flow control valve according to claim 1, wherein two pairs of cantilever springs are arranged in corresponding clearance spaces tangentially with respect to said valve plug and on opposing sides of a flow channel through said valve housing.

8. The flow control valve according to claim 7, wherein the cantilever springs of each pair are arranged in parallel and two cantilever springs of either pair are arranged in opposing coaxial relationship.

9. The flow control valve according to claim 1, further comprising an actuating shaft mounted rotatable in said valve housing and an Oldham coupling which couples said valve plug to said actuating shaft.

10. The flow control valve according to claim 9, wherein said clearance space is arranged perpendicular to the axis of said actuating shaft in said valve housing.

11. The flow control valve according claim 1, wherein said valve plug comprises an essentially cylindrical hollow body having a cylindrical plug sealing face in contact with a corresponding sealing face of said valve seat.

12. The flow control valve according to claim 1, wherein said flow control valve is comprised in a pulverized coal injection system for a blast furnace.

13. A flow control valve for fluidized material comprising:
a valve housing having first and second retention pins and a valve chamber with a valve seat, said valve seat being arranged in a conjugated socket in said valve housing;
a valve plug having a flow passage, said valve plug being arranged inside said valve chamber in front of said valve seat so as to be rotatable about an axis of rotation for controlling a flow through said flow control valve and said valve plug comprises a cylindrical plug biasing surface;
at least one cantilever spring arranged in a clearance space opposite to said valve seat, said cantilever spring being fixed to said valve housing and having an end portion in contact with said cylindrical plug biasing surface so as to bias said valve plug against said valve seat perpendicularly to said axis of rotation for achieving a sealing contact between said valve seat and said valve plug, wherein said first and second retention pins are configured to secure said valve plug when said at least one cantilever spring is removed; and
an adjustment device supporting said second end portion of said cantilever spring, said adjustment device allowing the axial position of said cantilever spring with respect to said valve plug to be set.

14. The flow control valve according to claim 13, wherein said adjustment device comprises an operating portion for setting the axial position of said cantilever spring, said operating portion protruding from said valve housing.

15. The flow control valve according to claim 14, wherein said at least one cantilever spring is a rod spring with a first end portion spring biasing said valve plug against said valve seat and a second end portion fixed to said valve housing.

16. The flow control valve according to claim 15, wherein said rod spring tapers towards its first end portion and comprises a saddle member mounted on a first end portion of said rod spring and having a contact surface conformed to the outer cylindrical plug biasing surface of said valve plug.

17. The flow control valve according to claim 16, wherein two pairs of rod springs are arranged in corresponding clearance spaces tangentially with respect to said valve plug and on opposing sides of a flow channel through said valve housing.

18. The flow control valve according to claim 17, wherein the rod springs of each pair are arranged in parallel and two rod springs of either pair are arranged in opposing coaxial relationship.

19. The flow control valve according to claim 18, further comprising an actuating shaft mounted rotatable in said valve housing and an Oldham coupling which couples said valve plug to said actuating shaft.

20. The flow control valve according to claim 19, wherein said clearance space is arranged perpendicular to the axis of said actuating shaft in said valve housing.

21. The flow control valve according claim 20, wherein said valve plug comprises an essentially cylindrical hollow body having a cylindrical plug sealing face in contact with a corresponding sealing face of said valve seat.

22. A flow control valve for fluidized material comprising:
a valve housing having first and second retention pins and a valve chamber with a valve seat, said valve seat being arranged in a conjugated socket in said valve housing;
a valve plug having a flow passage, said valve plug being arranged inside said valve chamber in front of said valve seat so as to be rotatable about an axis of rotation for controlling a flow through said flow control valve and said valve plug comprises a cylindrical plug biasing surface; and
at least two pairs of cantilever springs wherein at least one cantilever spring of said two pairs is arranged in a clearance space opposite to said valve seat, said cantilever spring being fixed to said valve housing and having an end portion in contact with said cylindrical plug biasing surface so as to bias said valve plug against said valve seat perpendicularly to said axis of rotation for achieving a sealing contact between said valve seat and said valve plug,
wherein two pairs of cantilever springs are arranged in corresponding clearance spaces tangentially with respect to said valve plug and on opposing sides of a flow channel through said valve housing, wherein said first and second retention pins are configured to secure said valve plug when said at least one cantilever spring is removed.

23. The flow control valve according to claim 22, wherein the cantilever springs of each pair are arranged in parallel and two cantilever springs of either pair are arranged in opposing coaxial relationship.

24. The flow control valve according to claim 22, wherein said at least one cantilever spring is a rod spring with a first end portion spring biasing said valve plug against said valve seat and a second end portion fixed to said valve housing, said rod spring tapering towards its first end portion.

25. The flow control valve according to claim 22, wherein said rod spring comprises a saddle member mounted on a first end portion of said rod spring and having a contact surface conformed to the outer cylindrical plug biasing surface of said valve plug.

26. The flow control valve according to claim 22, further comprising an adjustment device supporting said second end portion of said rod spring, said adjustment device allowing the axial position of said rod spring with respect to said valve plug to be set and comprising an operating portion for setting the axial position of said rod spring, said operating portion protruding from said valve housing.

* * * * *